(12) United States Patent
Ibaraki (10) Patent No.: US 7,623,181 B2
(45) Date of Patent: Nov. 24, 2009

(54) PANHEAD

(75) Inventor: Shouichi Ibaraki, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 11/458,277

(22) Filed: Jul. 18, 2006

(65) Prior Publication Data

US 2007/0019106 A1 Jan. 25, 2007

(30) Foreign Application Priority Data

Jul. 19, 2005 (JP) ............................... 2005-208960

(51) Int. Cl.
*H04N 5/225* (2006.01)
*A47G 29/00* (2006.01)
*F16M 11/04* (2006.01)

(52) U.S. Cl. ...................... 348/373; 348/374; 348/375; 248/371; 248/187.1

(58) Field of Classification Search ............ 348/211.99, 348/374, 375, 207.99, 208.3, 204.4, 373, 348/143; 248/177.1, 292.12, 371, 187.1, 248/370

See application file for complete search history.

(56) References Cited

U.S. PATENT DOCUMENTS 3,995,797 A   12/1976   Knight 5,412,417 A * 5/1995 Tozuka .................... 348/14.01
5,734,414 A * 3/1998 Nishimura et al. ........ 348/14.05
6,124,892 A * 9/2000 Nakano ...................... 348/373
7,202,904 B2 * 4/2007 Wei ............................ 348/373
7,286,181 B2 * 10/2007 Cha ........................... 348/373

FOREIGN PATENT DOCUMENTS

| JP | 50-106513 |   | 9/1975 |   |
|----|-----------|---|--------|---|
| JP | 2000-147643 A |   | 5/2000 |   |
| JP | 2000147643 A | * | 5/2000 | ............. 348/208.3 |
| JP | 2002-195487 A |   | 7/2002 |   |

* cited by examiner

*Primary Examiner*—Lin Ye
*Assistant Examiner*—Marly Camargo
(74) *Attorney, Agent, or Firm*—Rossi, Kimms & McDowell, LLP (57) ABSTRACT

A panhead which is capable of appropriately operating an image pickup device by a simple mechanism thereof. A fixed unit is set on a base of a camera-attached panhead. A pan rotation unit is supported on the pan fixed unit, for rotation within a plane parallel with the upper surface of the pan fixed unit. Two parallel-link mechanisms connect between a camera unit and the pan rotation unit and move the camera unit to a predetermined position in which a direction of an optical axis of the image pickup device is able to be maintained, depending on the use mode of the camera unit.

7 Claims, 8 Drawing Sheets

PANHEAD

BACKGROUND OF THE INVENTION

1. Field of the Invention

The present invention relates to a panhead for rotatably supporting a camera unit.

2. Description of the Related Art

Conventionally, there has been proposed a technique related to a panhead for rotatably supporting a camera unit, which causes the lens principal point (center point) position of the camera unit to constantly align with the rotational axis of the same and provides effective means for panorama shooting (means for making joints between a plurality of images look natural) (see e.g. Japanese Laid-Open Patent Publication (Kokai) No. 2000-147643). According to the proposed technique, the lens principal point position is caused to be aligned with the rotational axis of the camera unit in accordance with movement of the lens principal point position for a focus operation or a zoom operation during a panorama shooting.

The above conventional art, however, suffers from the problem that in a normal use mode (in which panorama shooting is not performed), the center-of-gravity position of a rotary body including the camera unit deviates from the rotational axis of the camera unit. This causes reduction of the rotational speed of the rotary body and an increase in the rise time (time required for enabling rotation) of the same. On the other hand, to overcome the problem to thereby increase the rotational speed of the rotary body and reduce the rise time, a large rotary drive mechanism is required.

SUMMARY OF THE INVENTION

It is an object of the present invention to provide a panhead which is capable of appropriately operating an image pickup device by a simple mechanism thereof.

To attain the above object, the present invention provides a panhead comprising, a fixed unit that is set as a base, a rotation unit that rotates within a plane parallel with a surface of the fixed unit, and a moving mechanism that connects between an image pickup device and the rotation unit and moves the image pickup device to a predetermined position depending on a use mode of the image pickup device.

According to the present invention, the image pickup device is moved to the predetermined position depending on a mode in which the image pickup device is used, so that the panhead can appropriately operate the image pickup device by the simple mechanism thereof.

In a normal use mode, in accordance with shift of the center of gravity of the image pickup device, the image pickup device is moved to a position where the center-of-gravity position of the image pickup device is aligned with the rotational axis of the same. This makes it possible to rotate the image pickup device and the rotation unit with a smaller force and stop them accurately. It is also possible to cause rotation of the image pickup device and the rotation unit to reach a predetermined rotational speed in a short time period.

In a panorama shooting mode, in accordance with shift of the lens principal point of the image pickup device, the image pickup device is moved to a position where the lens principal point position of the camera unit is aligned with the rotational axis of the same. This makes it possible to improve the quality of panorama images.

Preferably, the predetermined position is a position where a center-of-gravity position of the image pickup device and a rotational axis of the image pickup device are aligned with each other.

Preferably, the predetermined position is a position where a principal point position of a lens provided in the image pickup device and a rotational axis of the image pickup device are aligned with each other.

Preferably, the moving mechanism is a parallel-link mechanism for changing a position of the image pickup device relative to the rotation unit in parallel with the upper surface of the fixed unit.

Preferably, the moving mechanism is a slide mechanism for changing a position of the image pickup device relative to the rotation unit in parallel with the upper surface of the fixed unit.

Preferably, in a normal use mode of the image pickup device, the moving mechanism moves the image pickup device in accordance with shift of a center of gravity of the image pickup device to a position where a center-of-gravity position of the image pickup device and a rotational axis of the image pickup device are aligned with each other.

Preferably, in a panorama shooting mode of the image pickup device, the moving mechanism moves the image pickup device in accordance with shift of a lens principal point of the image pickup device to a position where a principal point position of the lens provided in the image pickup device and a rotational axis of the image pickup device are aligned with each other.

Preferably, the image pickup deice does not move a lens for zooming or focusing, until the moving mechanism terminates the movement of the image pickup device.

Preferably, the panhead further comprises a first rotation mechanism for rotating the rotation unit within a plane parallel with the upper surface of the fixed unit, and a second rotation mechanism for rotating the image pickup device about an axis parallel with the upper surface of the fixed unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

DESCRIPTION OF THE EMBODIMENTS

Preferred embodiments of the present invention will be described in detail below with reference to the drawings.

In the following, a description will be given of a first embodiment of the present invention.

Figure 1:
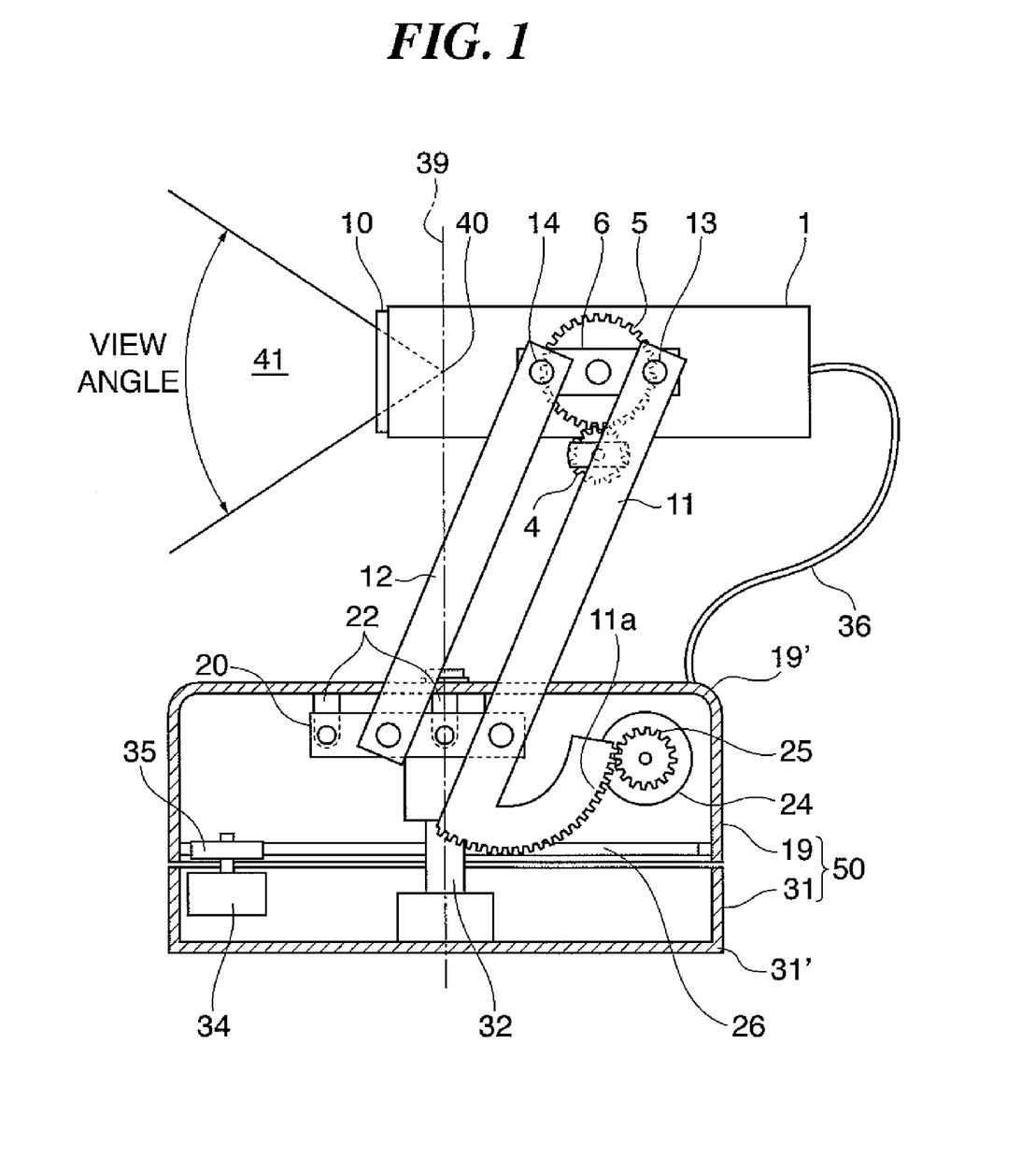
FIG. 1 is a front view of a camera-attached panhead (in a principal point position-aligned state) as a panhead according to a first embodiment of the present invention.
Figure 2:
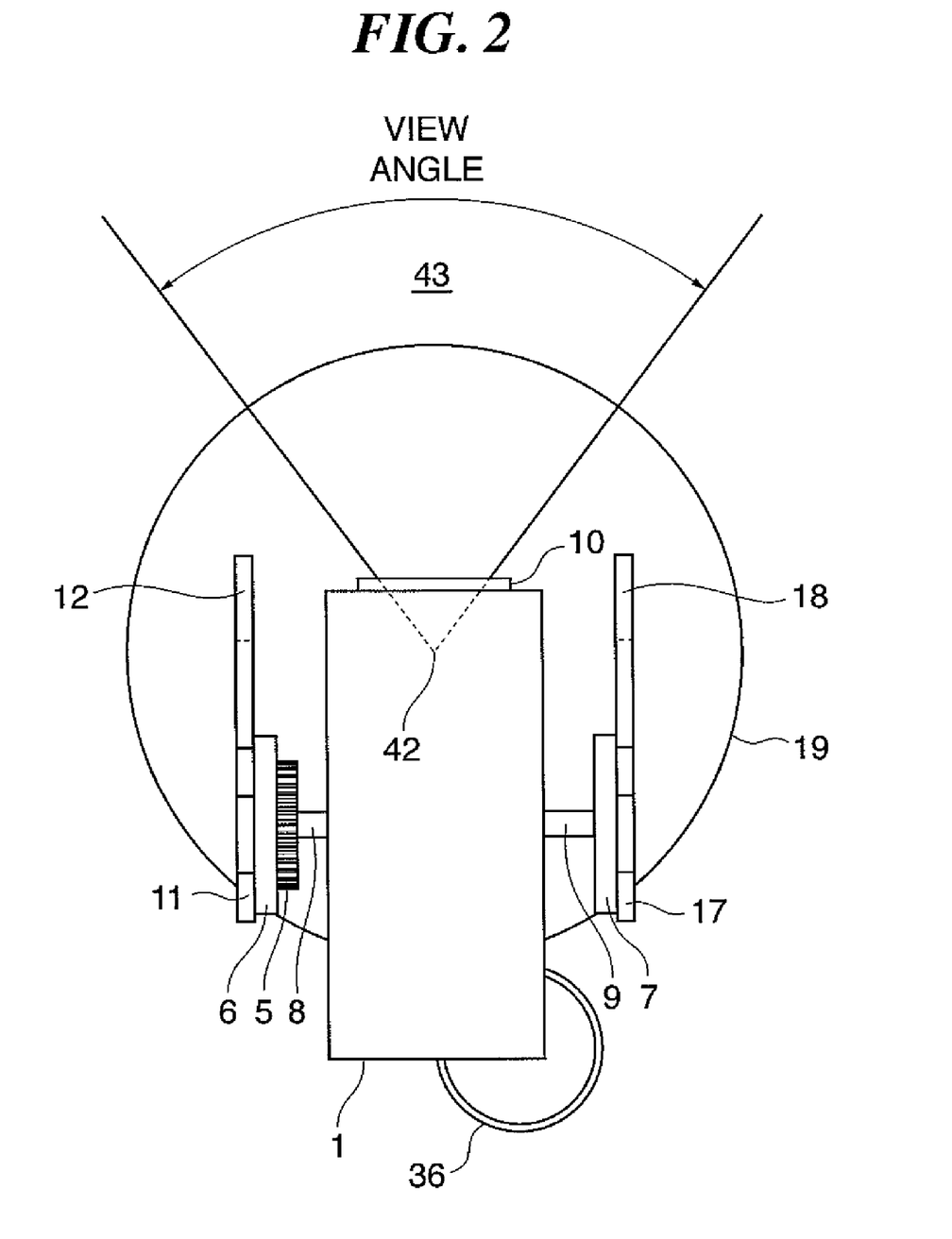
FIG. 2 is a plan view of the camera-attached panhead.

FIG. 1 is a front view of a camera-attached panhead (in a principal point position-aligned state) as a panhead according to a first embodiment of the present invention. FIG. 2 is a plan view of the camera-attached panhead, and FIG. 3 is a side view of the same.

Figure 3:
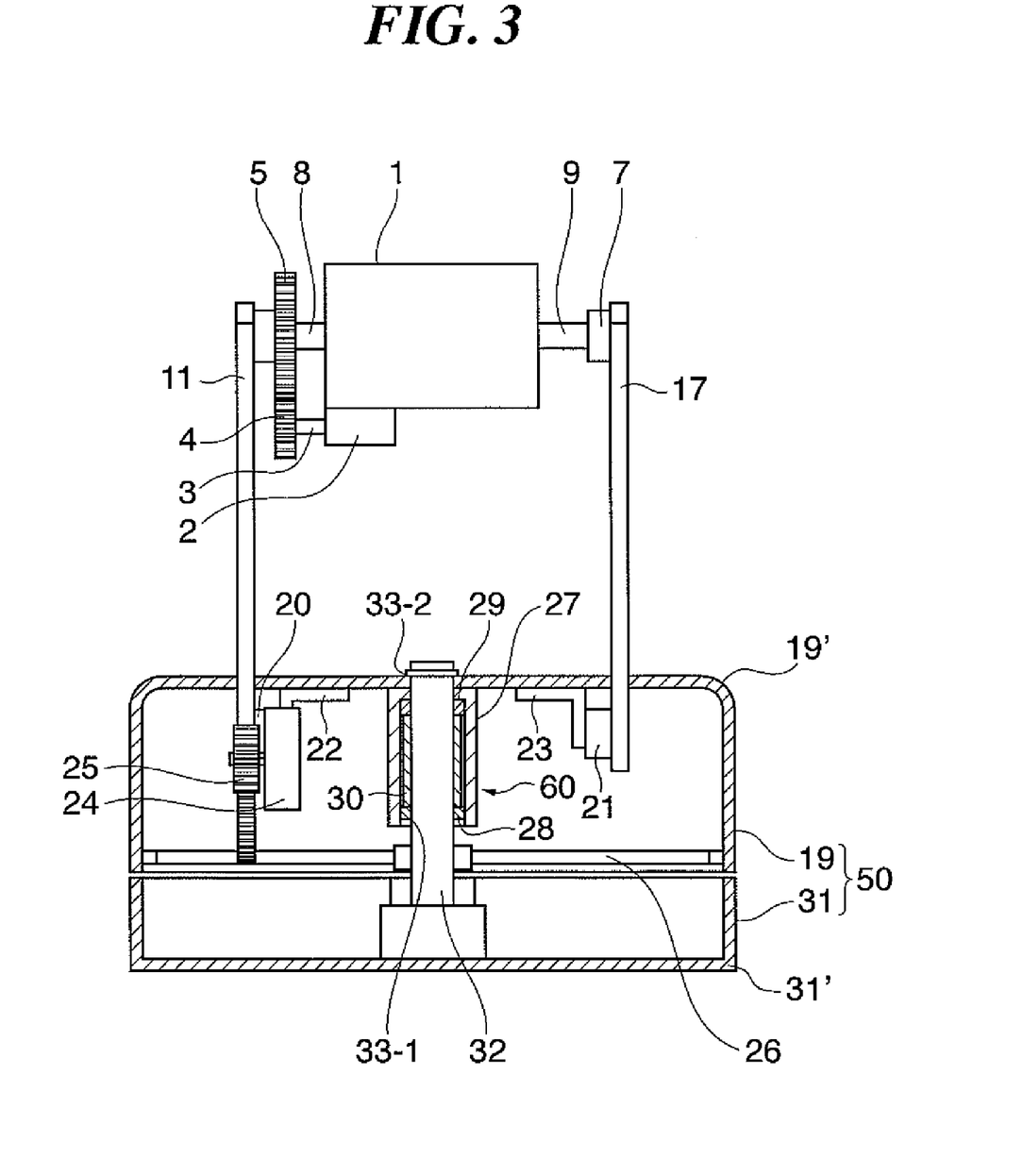
FIG. 3 is a side view of the camera-attached panhead.

As shown in FIGS. 1 to 3, the camera-attached panhead is basically comprised of a camera unit 1, a panhead 50, and link rods 11, 12, 17, and 18. The camera unit 1 is provided with a front lens retainer 10. The panhead 50 is comprised of a pan rotation unit 19, and a pan fixed unit 31. FIG. 1 shows of the camera-attached panhead in a state in which the lens principal point position of the camera unit 1 is aligned with the rotational axis of the same.

First, a description will be given of the construction of the camera unit 1. The camera unit 1 has a normal use mode (in which panorama shooting is not performed) and a panorama mode (in which panorama shooting is performed). The front lens retainer 10 is a hollow cylindrical member that retains a front lens, not shown, as a first lens to receive external light when shooting is performed by the camera unit 1. Light having passed through lenses, including the front lens, of the camera unit 1 is converted from an optical signal into an electric signal by an image pickup section, not shown. The electric signal obtained by the image pickup section is sent to the panhead 50 via a cable 36 (or further to an external device via the panhead 50). Within the camera unit 1, there is provided a memory, not shown, for storing shot images.

Figure 4:
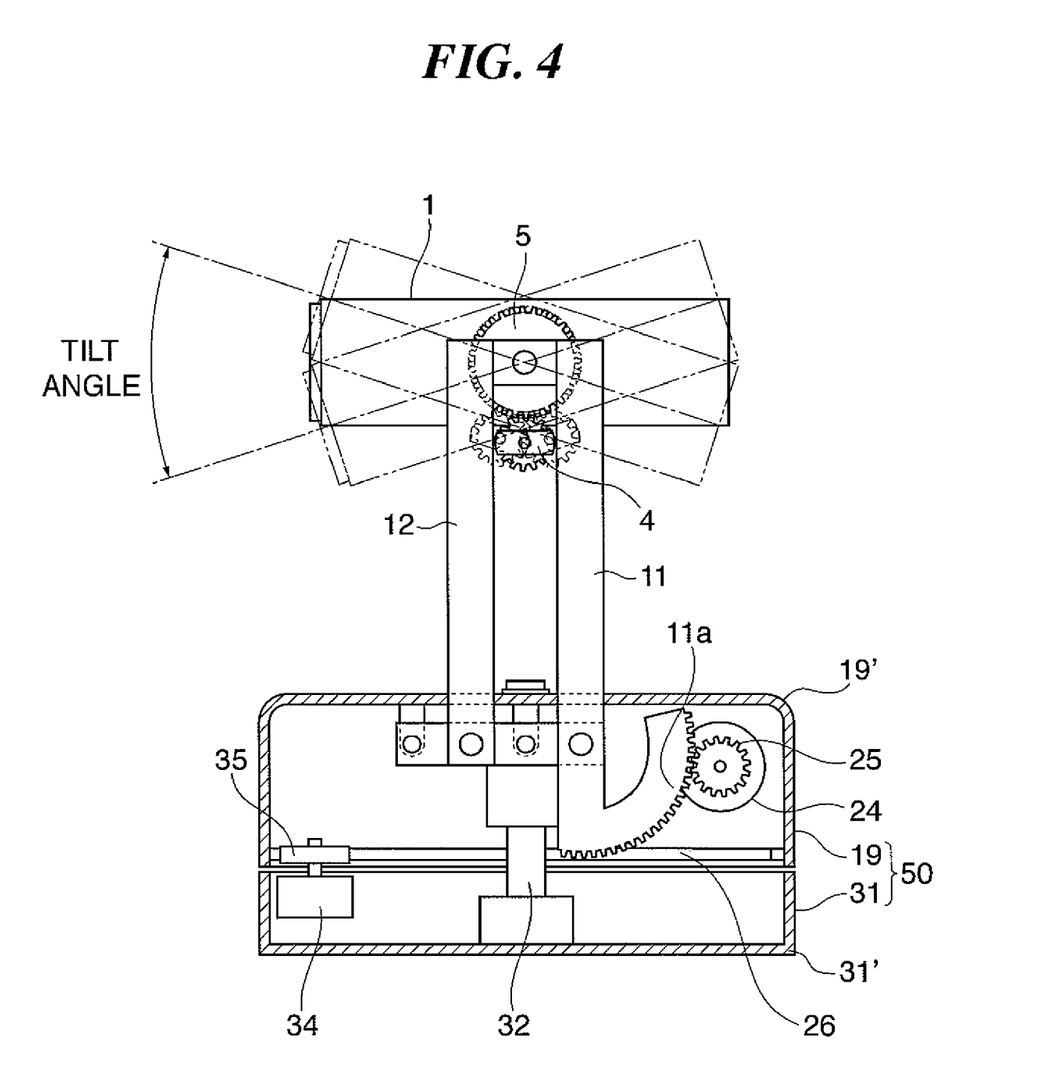
FIG. 4 is a view useful in explaining tilt rotation of a camera unit.

A tilt motor 2 is fixed to the bottom of the casing of the camera unit 1, and generates a driving force for causing tilt rotation (rotational movement about a horizontal axis) of the camera unit 1 (see FIG. 4). Within the camera unit 1, there is provided a motor drive circuit, not shown, for driving the tilt motor 2. A rotary tilt gear 4 is rigidly fitted on a rotating shaft 3 of the tilt motor 2, and rotates along with the rotating shaft 3. A fixed tilt gear 5 has a hole, not shown, and is fixed to a camera side panel 6. The fixed tilt gear 5 is in constant mesh with the rotary tilt gear 4.

The camera side panel 6 and a camera side panel 7 are disposed at respective locations such that they are opposed to each other with the camera unit 1 sandwiched from opposite longitudinal sides of the camera unit 1. A tilt shaft 8 and a tilt shaft 9 are fixed to the camera unit 1 at respective locations substantially corresponding to the center-of-gravity position of the camera unit 1 such that they extend in a horizontal direction orthogonal to the optical axis of the camera unit 1. The tilt shaft 8 extends through the hole of the fixed tilt gear 5, and is rotatably attached to the camera side panel 6. The tilt shaft 9 is rotatably attached to the camera side panel 7.

The link rods 11 and 12 are rotatably mounted on the camera side panel 6 by respective rivets 13 and 14. The link rod 11 has an integrally formed semicircular gear part 11a at its end on the opposite side to its end attached to the camera side panel 6. The link rods 17 and 18 are rotatably mounted on the camera side panel 7 by rivets, not shown, respectively. The link rods 17 and 18 are not formed with a gear.

Next, a description will be given of the construction of the panhead 50. The pan rotation unit 19 is comprised of a hollow cylindrical casing 19' which performs pan rotation in a state supported by the pan fixed unit 31, a pan side panel 20, a pan side panel 21, a pair of angles 22, a pair of angles 23, a link motor 24, a link gear 25, and a pan gear 26. The pan rotation unit 19 is driven by a pan motor, described hereinafter, for rotation within a horizontal plane (a plane parallel with an upper surface of the pan fixed unit 31). The pan side panel 20 is provided in a manner associated with the link rods 11 and 12, and is fixed to the pan rotation unit 19 via the angles 22. The pan side panel 21 is provided in a manner associated with the link rods 17 and 18, and is fixed to the pan rotation unit 19 via the angles 23.

The lower end (the end on the opposite side to the end attached to the camera side panel 6) of each of the link rods 11 and 12 is rotatably riveted to the associated pan side panel 20. The link rods 11 and 12, the camera side panel 6, and the pan side panel 20 form a parallel-link mechanism. The lower end (the end on the opposite side to the end to the camera side panel 7) of each of the link rods 17 and 18 is rotatably riveted to the associated pan side panel 21. The link rods 17 and 18, the camera side panel 7, and the pan side panel 21 form a parallel-link mechanism.

The two parallel-link mechanisms are interlocked via the camera unit 1 to move the camera unit 1 to desired positions including predetermined positions (a position in which the center-of-gravity position of the camera unit 1 and the rotational axis of the same are aligned with each other, and a position in which the lens principal point of the camera unit 1 and the rotational axis of the same are aligned with each other).

The link motor 24 is fixed within the pan rotation unit 19, and generates a driving force for operating the two parallel-link mechanisms. In the pan rotation unit 19, there is provided a motor drive circuit, not shown, for driving the link motor 24. The link gear 25 is rigidly fitted on the rotating shaft of the link motor 24 for rotation along with the same. The link gear 25 is meshed with the semicircular gear part 11a integrally formed on the link rod 11.

The pan gear 26 is circumferentially formed on the inner wall of the pan rotation unit 19, and is meshed with a pan rotation gear 35, described hereinafter. A bearing unit 60 is provided in a central part within the pan rotation unit 19. The bearing unit 60 is comprised of a bearing housing 27, a bearing 28, and a bearing 29. Within the bearing housing 27, the bearings 28 and 29 are fixed with a sleeve 30 sandwiched therebetween in a pressurized state.

The pan fixed unit 31 is comprised of a hollow cylindrical casing 31' which is set (placed) as a base when the camera-attached panhead is in use, for supporting the pan rotation unit 19, a fixed shaft 32, and a pan motor 34. The fixed shaft 32 is press-fitted in a central part within the pan fixed unit 31, and extends through a central part within the pan rotation unit 19 to pass through a hole, not shown, formed along the rotational axis of the pan rotation unit 19. The bearing unit 60 of the pan rotation unit 19 is rotatably fitted on the fixed shaft 32.

The fixed shaft 32 has a stepped part 33-1 formed on an axially central portion thereof, and an E ring 33-2 fitted in recesses of an axially upper end thereof. The bearing 28 as a component of the bearing unit of the pan rotation unit 19 is in contact with the stepped part 33-1. The E ring 33-2 fixes the hollow cylindrical casing 19' to the fixed shaft 32. The vertical movement of the pan rotation unit 19 with respect to the pan fixed unit 31 is inhibited by the stepped part 33-1 and the E ring 33-2. The rotation of the pan rotation unit 19 is permitted by the bearings 28 and 29.

The pan motor 34 is fixed within the pan fixed unit 31, and generates a driving force for causing the pan rotation unit 19 to perform pan rotation. In the pan fixed unit 31, there is provided a motor drive circuit, not shown, for driving the pan motor 34. The pan rotation gear 35 is rigidly fitted on the rotating shaft of the pan motor 34, and is meshed with the pan gear 26. As the pan motor 34 rotates, the pan rotation gear 35 rotates along with rotation of the pan motor 34, which causes rotation of the pan rotation unit 19 via the pan gear 26 in mesh with the pan rotation gear 35.

In FIG. 1, reference numeral 39 designates the rotational axis of rotary bodies (the camera unit 1 and the pan rotation unit 19), 41 a shootable area determined by a vertical lens view angle range of the camera unit 1, and 40 the lens principal point position of the camera unit 1. Further, reference numeral 43 in FIG. 2 designates a shootable area determined by a horizontal lens view angle range of the camera unit 1, and 42 the lens principal point position.

Next, the operation of the thus constructed camera-attached panhead according to the present embodiment will be described with reference to FIGS. 1 to 6.

Figure 5:
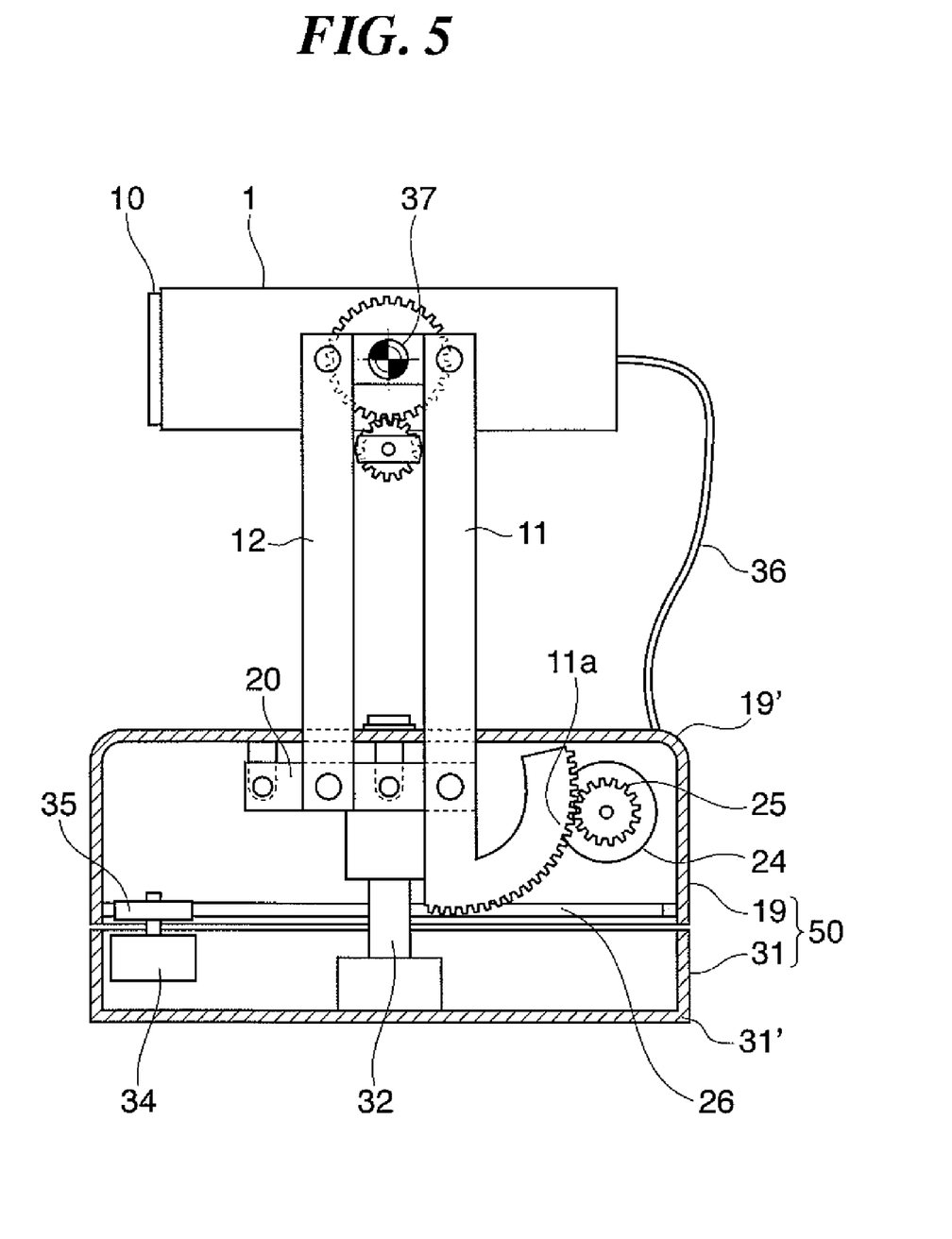
FIG. 5 is a front view of the camera-attached panhead (in a center-of-gravity position-aligned state)
Figure 6:
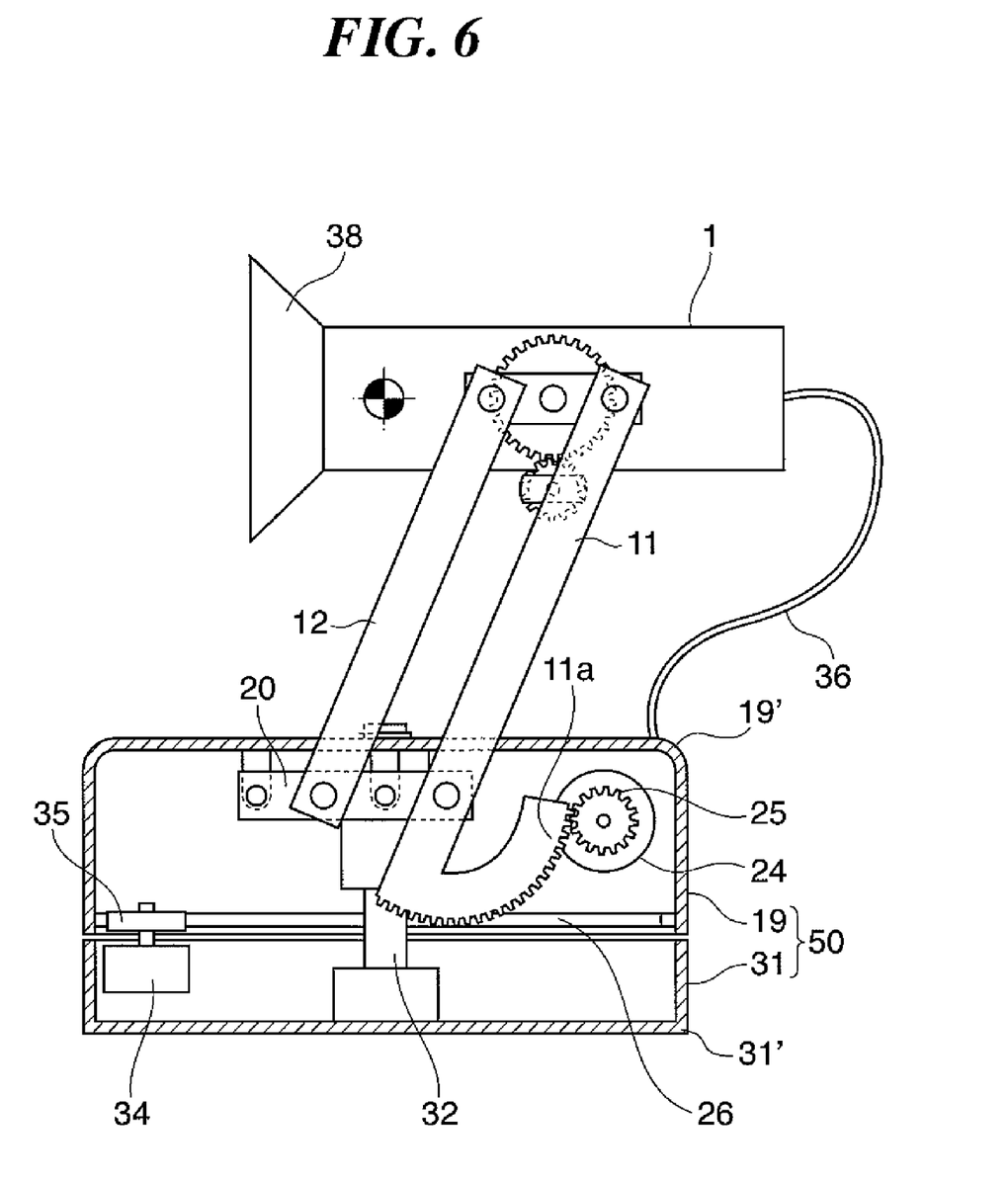
FIG. 6 is a view of the camera unit in a state in which a wide conversion lens is mounted thereon.

FIG. 4 is a view useful in explaining tilt rotation of the camera unit 1. FIG. 5 is a front view of the camera-attached panhead (in the center-of-gravity position-aligned state). FIG. 6 is a view of the camera unit 1 in a state in which a wide conversion lens is mounted thereon.

Referring to FIGS. 4 to 6, now let it be assumed that the camera unit 1 is caused to perform tilt rotation (rotation about the tilt axis). When the camera-attached panhead is instructed from the outside (e.g. through remote control operation) to cause the camera unit 1 to perform tilt rotation, the tilt motor 2 starts rotation under the control of the motor drive circuit.

In accordance with the rotation of the tilt motor 2, the rotary tilt gear 4 rigidly fitted on the rotating shaft 3 of the tilt motor 2 rotates along the fixed tilt gear 5 in mesh therewith. As shown in FIG. 4, the camera unit 1 performs pivotal motion about a horizontal tilt axis while being sandwiched between the camera side panel 6 to which the fixed tilt gear 5 is fixed and the camera side panel 7. Thus, the tilt rotation of the camera unit 1 can be achieved.

Next, a description will be given of the operation of the parallel-link mechanisms provided on the opposite sides of the camera unit 1.

In the case of moving the camera unit 1 forward and backward along the optical axis, the link rods 11 and 12 are rotated with respect to the pan side panel 20 fixed to the pan rotation unit 19. The other movements of the link rods 11 and 12 than the rotation are inhibited by the camera side panel 6, and hence the link rods 11 and 12 rotate while maintaining parallel linkage with the camera side panel 6 and the pan side panel 20. Similarly, the other movements of the link rods 17 and 18 than rotation are inhibited by the camera side panel 7, and hence the link rods 17 and 18 rotate while maintaining parallel linkage with the camera side panel 7 and the pan side panel 21. This makes it possible to shift the relative horizontal positional relationship between the camera unit 1 and the pan rotation unit 19.

Further, when the link motor 24 is driven, the link gear 25 in mesh with the gear part 11a integrally formed with the lower end of the link rod 11 is rotated. In accordance with this rotation of the link gear 25, the link rod 11 performs rotation to move the camera unit 1 in the manner as described above.

On the other hand, when the pan motor 34 is driven, the pan rotation gear 35 in mesh with the pan gear 26 circumferentially formed on the inner wall of the pan rotation unit 19 is rotated. In accordance with this rotation of the pan rotation gear 35, the camera unit 1 and the pan rotation unit 19 performs rotation. Thus, pan rotation of the camera-attached panhead can be achieved.

As shown by a mark 37 in FIG. 5, the center of gravity of the camera unit 1 is on the rotational axis of the casing of the camera unit 1. In general, when a rotary body rotates about an axis passing through the center of gravity thereof, energy required for the rotation is minimized, and the rotation of the rotary body can be stopped with high accuracy. To state it in another way, it is possible to cause the rotary body to reach a predetermined rotational speed with the same energy in a shorter time period. Therefore, as shown in FIG. 4, in the normal use mode, the camera unit 1 is moved by the link motor 24 via the link gear 25 and the link rod 11 to a position where the center of gravity of the camera unit 1 and the rotational axis of the same are aligned with each other. Thus, the center of gravity of the camera unit 1 and the rotational axis of the same are aligned with each other.

Further, when the camera unit 1 has a lens barrel provided with a member with a certain amount of mass for zoom operation, focus operation, and so forth, an instruction is given to the link motor 24 from a control section, not shown, of the camera-attached panhead or from the outside, based on a value calculated according to the distance of traveling of the member or determined by looking up a table prepared in advance. According to the instruction, the position of the camera unit 1 is shifted by the link motor 24 via the link gear 25 and the link rod 11, whereby the center-of-gravity position of the camera unit 1 and the rotational axis of the same are made aligned with each other.

In the case where the center-of-gravity aligning function is used, when the wide conversion lens 38 disposed forward of the front lens is fitted on the front lens retainer 10, for changing the magnification of the front lens to a wide angle side, as shown in FIG. 6, the center-of-gravity position of the camera unit 1 deviates from an originally set position.

The center-of-gravity position of the camera unit 1 with or without the wide conversion lens 38 being mounted on the front lens retainer 10 can be determined by obtaining the center-of-gravity position of the wide conversion lens 38 in advance. Therefore, by shifting the position of the camera unit 1 by the link motor 24 via the link gear 25 and the link rod 11, it is possible to align the center-of-gravity position of the camera unit 1 with the rotational axis of the same. This makes it possible to rotate the pan rotation unit 19 and the camera unit 1 with a smaller force.

Next, a description will be given of panorama shooting by the camera unit 1. In the case of performing panorama shooting, the following steps are carried out by control from the control section of the camera-attached panhead or an external device.

(1) The tilt angle of the camera unit 1 is determined.

(2) The zoom ratio of the camera unit 1 is fixed.

(3) The shooting range (pan rotational angle) is determined.

(4) The number of times of shooting operations and an indexed angle (panning angle per one shot) are calculated based on the zoom ratio and the pan rotational angle.

(5) The focus of the camera unit 1 is fixed.

(6) The lens principal point position of the camera unit 1 is calculated based on the zoom and focus values.

(7) The link motor 24 is operated based on the lens principal point position, and the camera unit 1 is moved along the optical axis so as to align the lens principal point position of the camera unit 1 with the rotational axis of the same.

(8) The camera unit 1 is rotationally moved to the center of the indexed angle calculated in the above step (4).

(9) A shooting operation by the camera unit is started (an image picked up by the shooting operation is stored in a storage area of the memory of the camera unit 1).

(10) Hereafter, the operation of rotationally moving the camera unit 1 and shooting is repeatedly carried out (images picked up by respective shooting operations are stored one by one in associated different storage areas of the memory of the camera unit 1).

(11) After completion of a final shooting operation, the camera unit 1 is moved to the position in the above step (9).

(12) The images stored in the respective storage areas of the memory of the camera unit 1 are corrected.

(13) The images stored in the respective storage areas of the memory of the camera unit 1 are synthesized in the direction of rotation of the camera unit 1.

According to the present embodiment, in the panorama shooting mode, the lens principal point position of the camera unit 1 is aligned with the rotational axis of the same. For this reason, differently from the case where the lens of a camera is not positioned in the principal point position, in the image correction performed in the step (12), no other correction is required than that of vertical displacement of images due to vertical shaking during rotation of the camera unit 1, which makes it possible to form an accurate and high-quality panorama image in a short image processing time.

It should be noted that during the shift of the camera unit 1 along the optical axis (step (7)), zoom-related lenses and focus-related lenses are not moved until termination of the shift of the camera unit 1. Further, during rotational movement of the camera unit 1 (step (8)), the lenses are not moved, either. This is to prevent the positions of the lenses from being displaced during movement of the camera unit 1 to cause displacement of the lens principal point position.

On the other hand, in the case where the lens principal point position of the camera unit 1 is not aligned with the rotational axis of the same, convergence to a near object occurs depending on the focal distance of a lens, and hence it is required to correct the parallax between images in an image superimposing area, which makes image processing time-consuming. Possibly, for parallax correction for an image of a nearer object, more image superimposing areas are necessitated, and hence more time is required for one panorama shooting. Further, an increase in the number of operations for image processing causes degradation of image quality.

The state in which the lens principal point position of the camera unit 1 is aligned with the rotational axis of the same is shown in FIGS. 1 and 2. In FIG. 1, a vertex of the shootable area 41 defined by the vertical lens view angle range of the camera unit 1 corresponds to the lens principal point position 40. Further, in FIG. 2, a vertex of the shootable area 43 defined by the horizontal lens view angle range of the camera unit 1 corresponds to the lens principal point position 42. Since the principal point position indicated by the reference numbers 40 and 42 is aligned with the rotational axis 39 of the rotary bodies (the camera unit 1 and the pan rotation unit 19), convergence of view angle ranges cannot occur when the camera unit 1 is rotationally moved during shooting, so that parallax correction and the like can be dispensed with.

In the states shown in FIGS. 1 and 2, non-alignment between the rotational axis of the camera unit 1 and the center-of-gravity position of the same cannot have adverse effects. This is because the rotational speed of the camera unit 1 is sufficiently lower and the rise time of rotation is longer than in the normal use mode so as to ensure accuracy in image superimposition in panorama shooting.

Next, a description will be given of an example of usage of the above described camera-attached panhead.

Figure 7:
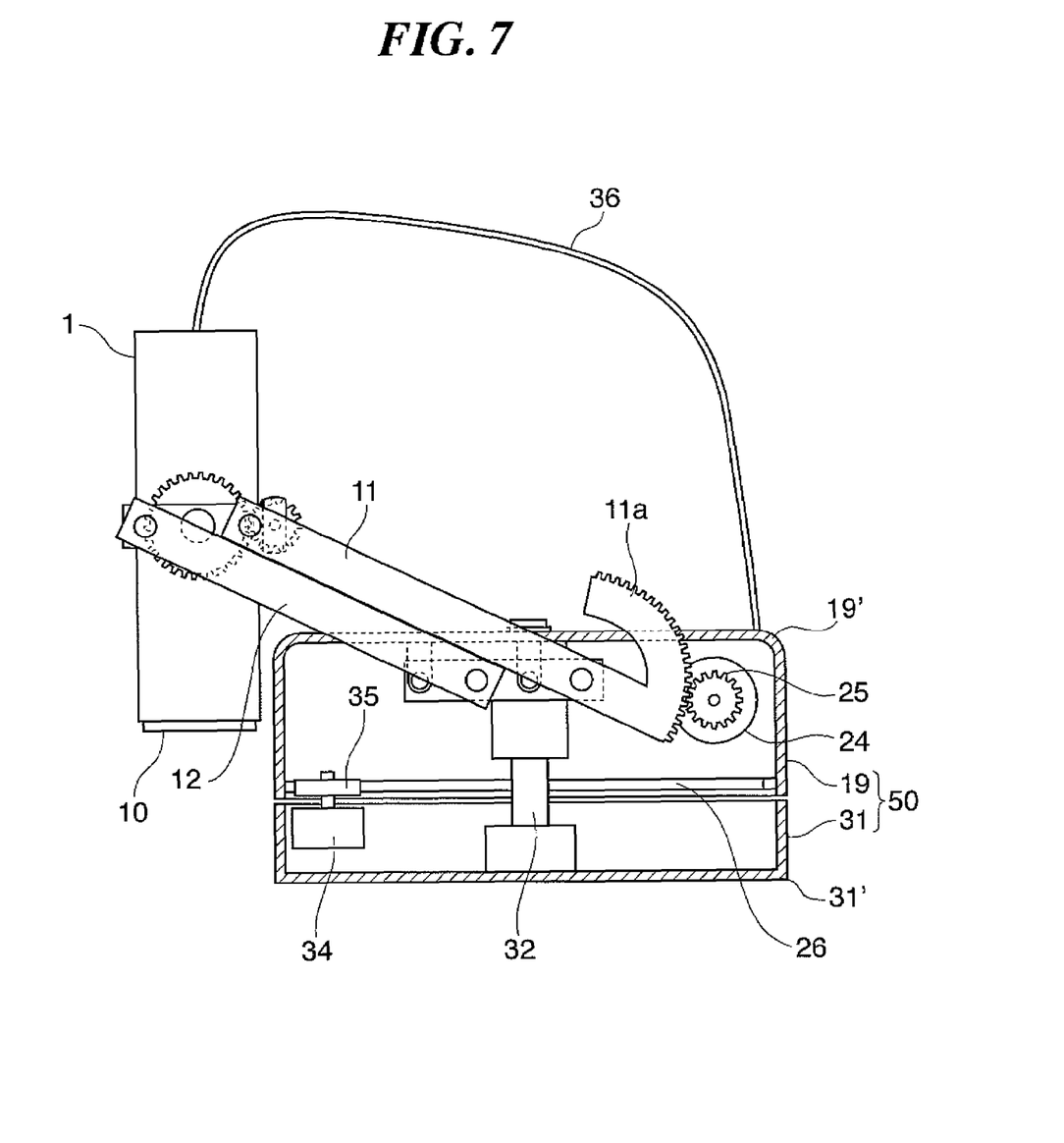
FIG. 7 is a view of an example of usage of the camera-attached panhead.

FIG. 7 is a view showing an example of usage of the camera-attached panhead.

Referring to FIG. 7, by moving the two parallel-link mechanisms connecting between the camera unit 1 and the pan rotation unit 19 of the camera-attached panhead, and causing the camera unit 1 to perform tilt rotation, it is possible to perform shooting in a substantially perpendicularly downward direction from the outer periphery of the pan rotation unit 19. The camera-attached panhead can be used, for example, for photographing an object placed downward of the camera-attached panhead, e.g. using a document camera for photographing documents and paintings.

As described above, according to the present embodiment, the camera unit 1 is moved to a predetermined position (the position where the center-of-gravity position of the camera unit 1 and the rotational axis of the same are aligned with each other, or the position where the lens principal point position of the camera unit 1 and the rotational axis of the same are aligned with each other) depending on the mode (the normal use mode or the panorama shooting mode) of the camera unit 1. This provides a solution to the conventional problem that the rotational speed of the rotary bodies is reduced and the rise time of rotation of the same is increased, which eliminates the need for providing a large rotation drive mechanism. This makes it possible to realize a camera-attached panhead which is capable of appropriately operating an image pickup device by a simple mechanism thereof.

In the normal use mode, the center-of-gravity position of the camera unit 1 is aligned with the rotational axis of the same, so that the camera unit 1 and the pan rotation unit 19 can be rotated with a smaller force and stopped with accuracy. It is also possible to cause rotation of the camera unit 1 and the pan rotation unit 19 to reach a predetermined rotational speed in a shorter time period.

In the panorama shooting mode, the lens principal point position of the camera unit 1 is aligned with the rotational axis of the same, so that no other correction is required than correction of vertical displacement of images due to vertical shaking during rotation of the camera unit 1, which makes it possible to form an accurate and high-quality panorama image in a short image processing time.

Next, a description will be given of a second embodiment of the present invention.

The second embodiment is distinguished from the first embodiment in that a slide mechanism is used for causing horizontal movement of the lens unit 1 relative to the pan rotation unit 19. Component elements identical to those of the first embodiment are designated by identical reference numerals, and description thereof is omitted.

Figure 8:
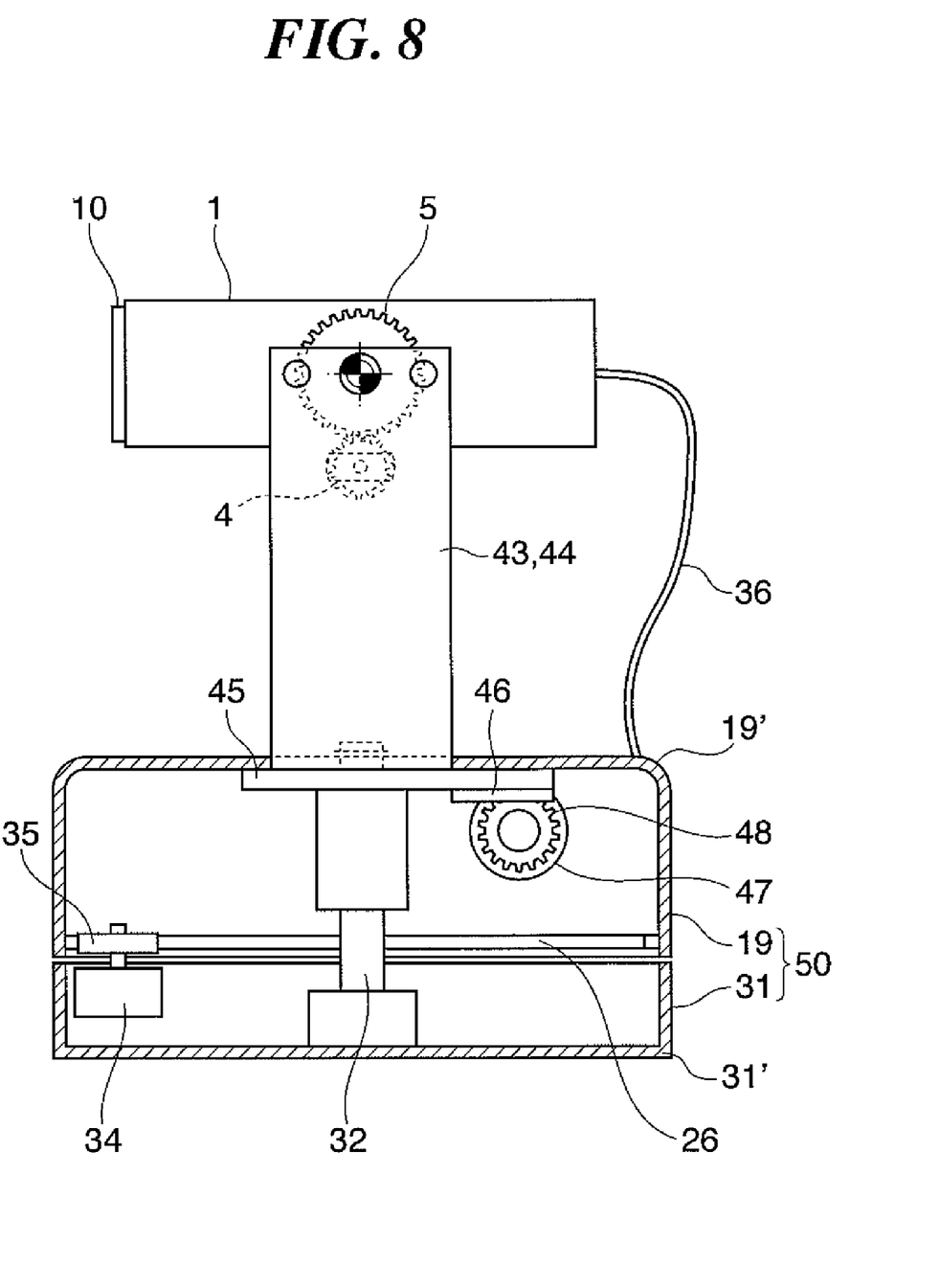
FIG. 8 is a front view of a camera-attached panhead as a panhead according to a second embodiment of the present invention.

FIG. 8 is a front view of a camera-attached panhead as a panhead according to the present embodiment.

As shown in FIG. 8, the camera-attached panhead is basically comprised of the camera unit 1, the panhead 50 having the pan rotation unit 19 and the pan fixed unit 31, and stands 43 and 44.

Between the camera unit 1 and the pan rotation unit 19, there are arranged stands 43 and 44 in facing relation with the camera unit 1 sandwiched from opposite longitudinal sides of the camera unit 1. The stands 43 and 44 rotatably hold the camera unit 1. The pan fixed unit 19 is comprised of a plate 45, a linear gear 46, a motor 47, and a gear 48.

The plate 45 is fixed to the lower ends of the respective stands 43 and 44, and is configured to be movable horizontally similarly to the pan rotation unit 19 which is rotatable horizontally. The linear gear 46 is fixed to a lower side of the plate 45. The motor 47 generates a driving force for horizontally moving the plate 45, and the gear 48 is rigidly fitted on the rotating shaft of the motor 47. The gear 48 is meshed with the linear gear 46, and rotates in synchronism with rotation of the motor 47.

As the motor 47 rotates, the linear gear 46 in mesh with the gear 48 moves in the horizontal direction (left-right direction as viewed in FIG. 8). In accordance with this movement of the linear gear 46, the plate 45 to which is fixed the linear gear 46 also moves in the horizontal direction, and hence the stands 43 and 44 as well move in the horizontal direction. In accordance therewith, it is possible to change the relative horizontal position between the camera unit 1 and the pan rotation unit 19. This makes it possible to align the rotational axis of the camera unit 1 with the center-of-gravity position of the rotary bodies (the camera unit 1 and the pan rotation unit 19) during the normal use mode. On the other hand, it is possible to align the rotational axis of the camera unit 1 with the lens principal point position of the camera unit 1 during the panorama shooting mode.

As described above, according to the present embodiment, the camera unit 1 is moved to a predetermined position (the position where the center-of-gravity position of the camera unit 1 and the rotational axis of the same are aligned with each other, or the position where the lens principal point position of the camera unit 1 and the rotational axis of the same are aligned with each other) depending on the mode (the normal use mode or the panorama shooting mode) of the camera unit 1. This provides a solution to the conventional problem that the rotational speed of the rotary bodies is reduced and the rise time of rotation of the same is increased, which eliminates the need for providing a large rotation drive mechanism. As a result, a camera-attached panhead which is capable of appropriately operating an image pickup device can be realized by a simple mechanism thereof.

In the normal use mode, the center-of-gravity position of the camera unit 1 is aligned with the rotational axis of the same, so that the camera unit 1 and the pan rotation unit 19 can be rotated with a smaller force and stopped with accuracy.

In the panorama shooting mode, the lens principal point position of the camera unit 1 is aligned with the rotational axis of the same, so that it is not necessary to carry out any other correction than correction of vertical displacement of images due to vertical shaking during rotation of the camera unit 1, which makes it possible to prepare an accurate and high-quality panorama image in a short image processing time.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-208960 filed Jul. 19, 2005, which is hereby incorporated by reference herein in its entirety.

What is claimed is:

1. A panhead comprising:
a fixed unit;
a rotation unit that rotates within a plane parallel with an upper surface of said fixed unit; and
a moving mechanism that connects between an image pickup device and said rotation unit and moves the image pickup device relative to the rotation unit to a predetermined position in which a direction of an optical axis of the image pickup device is able to be maintained, depending on a use mode of the image pickup device;
wherein in a normal use mode of the image pickup device, said moving mechanism moves the image pickup device in accordance with a shift of a center of gravity of the image pickup device to a position where the center of gravity of the image pickup device and a rotational axis of the image pickup device are aligned with each other.

2. A panhead as claimed in claim 1, wherein the predetermined position is a position where a principal point position of a lens provided in the image pickup device and a rotational axis of the image pickup device are aligned with each other.

3. A panhead as claimed in claim 1, wherein said moving mechanism is a parallel-link mechanism for changing a position of the image pickup device relative to said rotation unit in parallel with the upper surface of said fixed unit.

4. A panhead as claimed in claim 1, wherein said moving mechanism is a slide mechanism for changing a position of the image pickup device relative to said rotation unit in parallel with the upper surface of said fixed unit.

5. A panhead as claimed in claim 1, wherein in a panorama shooting mode of the image pickup device, said moving mechanism moves the image pickup device in accordance with shift of a lens principal point of the image pickup device to a position where a principal point position of the lens provided in the image pickup device and a rotational axis of the image pickup device are aligned with each other.

6. A panhead as claimed in claim 5, wherein the image pickup device does not move a lens for zooming or focusing, until the moving mechanism terminates the movement of the image pickup device.

7. A panhead as claimed in claim 1, further comprising a first rotation mechanism for rotating said rotation unit within a plane parallel with the upper surface of said fixed unit, and a second rotation mechanism for rotating the image pickup device about an axis parallel with the upper surface of said fixed unit.

* * * * *